United States Patent Office 2,916,257
Patented Dec. 8, 1959

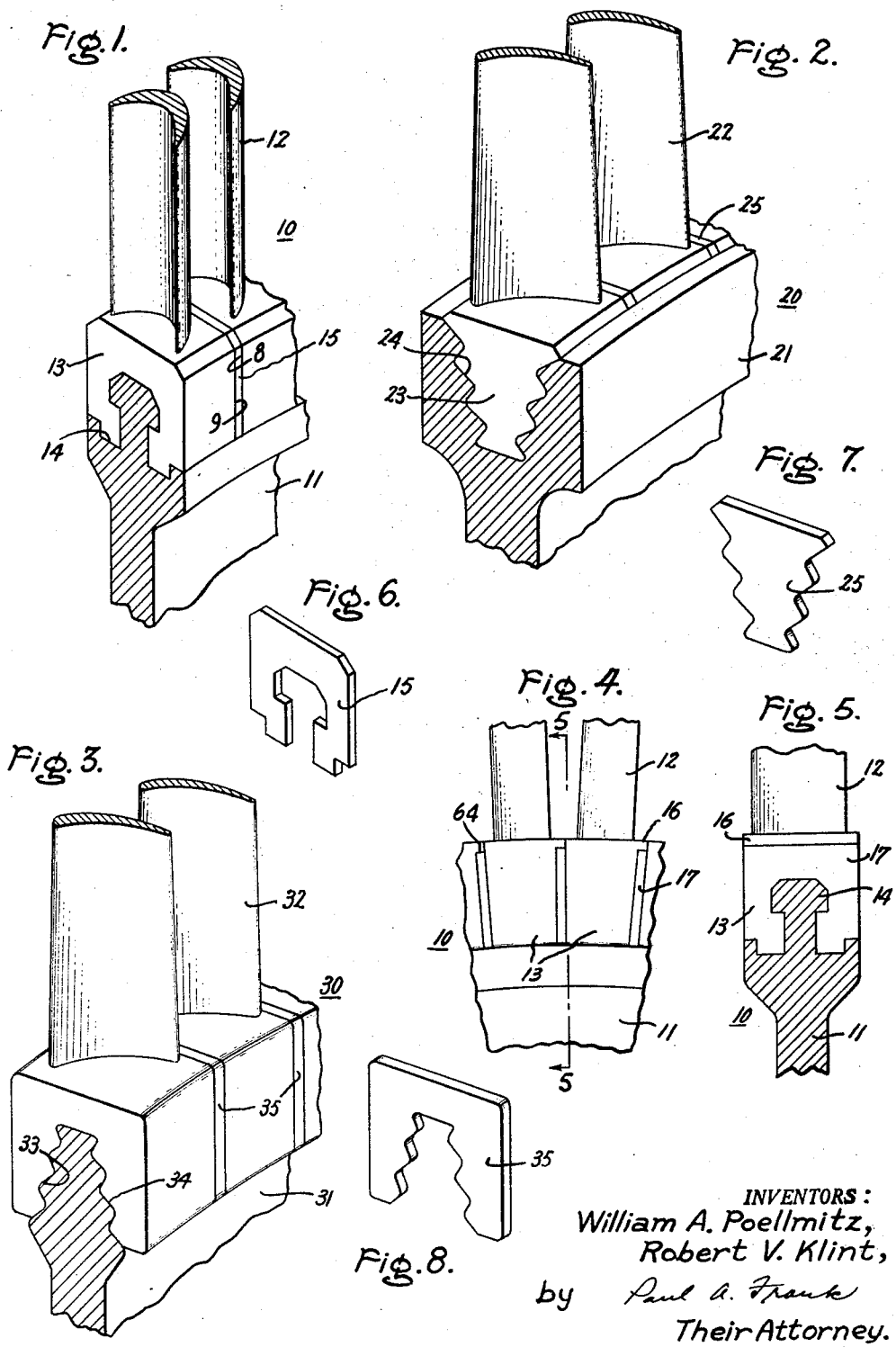

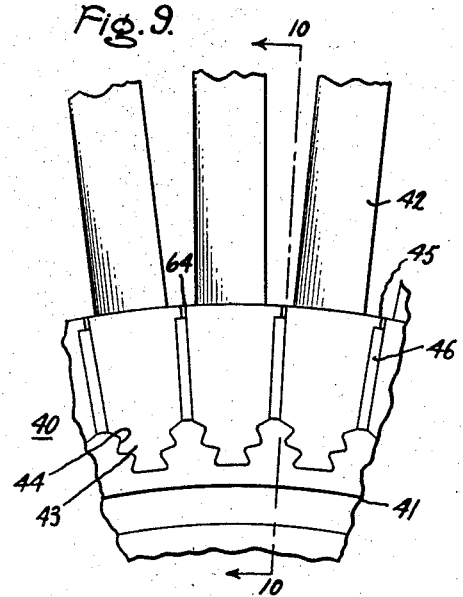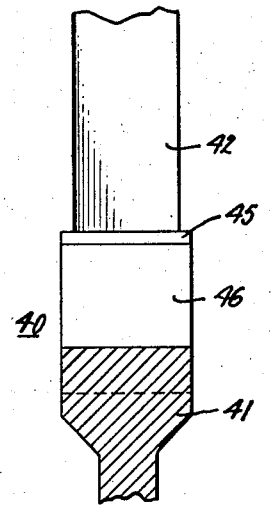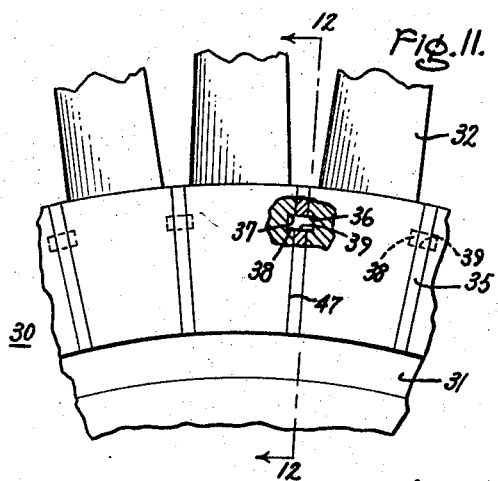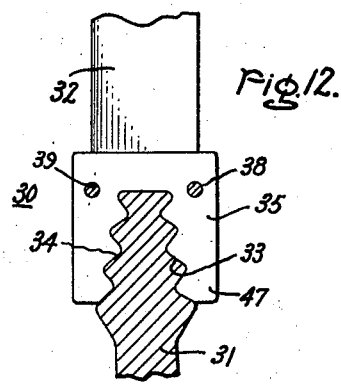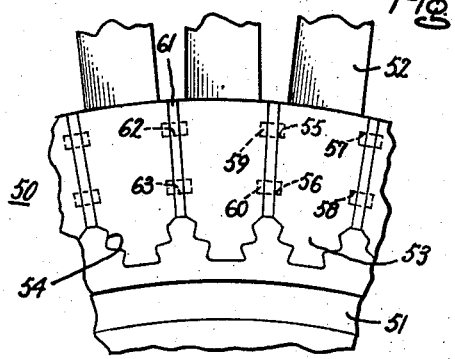

2,916,257

DAMPING TURBINE BUCKETS

William A. Poellmitz and Robert V. Klint, Schenectady, N.Y., assignors to General Electric Company, a corporation of New York Application December 30, 1953, Serial No. 401,218

2 Claims. (Cl. 253—77)

This invention relates to fluid turbines and, more particularly, to the vibration damping of the buckets used in steam and gas turbines.

One of the serious problems met in steam and gas turbine operation is the tendency of the turbine buckets to fracture when subjected to a vibrational stress at or near resonant frequency. During acceleration or deceleration of the steam and gas turbine, the buckets are, momentarily at least, subjected to vibrational stresses at their fundamental resonant frequency and in many cases to vibrational stresses at secondary or even higher resonant frequencies. When a bucket is subjected to a vibrational stress at or near its resonant frequency, its amplitude of vibration can readily build up to a point where fatigue fractures occur. Such fractures have readily occurred in the very tough and heat-stable metals or alloys from which turbine blades are fabricated.

The buckets which are most prone to fracture are those which are rigidly positioned in the turbine disk. In most cases, the presence of a slight fracture caused by vibration results in a damping effect which helps to safeguard the blade or bucket from further vibrational deterioration. However, the protection afforded by the damping effect of the fracture does not prevent further slow progress of the fracture, and it is not unusual for a portion of a turbine bucket to be broken off entirely. This condition decreases the efficiency of energy conversion and unbalances the turbine disk thereby increasing vibration. The desirability of damping turbine buckets to resist the fracturing effect of a vibrational stress at or near the resonant frequency vibration of the bucket is obvious.

Accordingly, it is an object of this invention to provide a turbine bucket assembly which will resist fracture of the buckets when a vibrational stress is applied thereto.

It is another object of this invention to provide a new and improved bucket assembly for use in a steam turbine.

It is a further object of the invention to provide a turbine bucket assembly which utilizes frictional forces to achieve damping.

Briefly stated, in accordance with one of its aspects, this invention comprises a turbine bucket assembly having a resilient spacer or wafer applied between each of the mountings of the turbine buckets assembled on a rotor to damp the vibrations thereof.

These and various other objects, features, and advantages of the invention will be better understood from the following description taken in connection with the accompanying drawing in which Fig. 1 is a sectional view of a preferred embodiment of our invention applied to a turbine bucket assembly structure;

Fig. 2 is a sectional view of a modified embodiment of our invention applied to a turbine bucket assembly wherein the turbine buckets utilize a dovetail mounting which is applied tangentially to the wheel;

Fig. 3 is a sectional view of a modified embodiment of our invention applied to a turbine bucket assembly structure;

Fig. 4 is a side elevational view of a modified turbine bucket assembly;

Fig. 5 is a sectional view taken along the lines 5—5 of Fig. 4;

Fig. 6 is a perspective view of the resilient spacer shown in Fig. 1;

Fig. 7 is a perspective view of the resilient spacer shown in Fig. 2;

Fig. 8 is a perspective view of the resilient spacer shown in Fig. 3;

Fig. 9 is a side elevational view of a modified form of a turbine bucket assembly;

Fig. 10 is a sectional view taken along the lines 10—10 of Fig. 9;

Fig. 11 is a side elevational view of a modified form of a turbine bucket assembly;

Fig. 12 is a sectional view taken along the lines 12—12 of Fig. 11; and

Fig. 13 is a side elevational view of a modified form of a turbine bucket assembly.

Referring to Figs. 1 and 6 in the drawings, a turbine bucket assembly, which can be used in steam or gas turbine construction, or particularly where the turbine buckets are applied to the wheel tangentially, is indicated generally at 10, comprising a rotor or turbine disk 11 having a plurality of buckets or blades 12 mounted in uniform spacing around the periphery thereof. Tangentially mounting or circumferentially mounting of buckets on a turbine wheel is a well known and common practice. Referring, for example, to Figs. 1 through 6, the assembling method generally comprises a mounting section of the turbine wheel which is removed, that is, which has no T-tang or dovetail configuration. Each bucket is, therefore, placed in this removed portion and moved circumferentially about the turbine disc and the practice continues until the full number of buckets is mounted on the disc. Thereafter, a spacer block may be used to fill the remaining space or a special type blade mounting affixed thereto. Each of the buckets 12 consists of an elongated body contoured to convert a portion of kinetic energy of a passing fluid strain to a rotational mechanical energy. The blade 12 is shown as mounted on the disk 11 by means of a conventional hook-on type mounting base 13 having a fit with a T-tang disk mounting 14. While a conventional type of mounting is illustrated, it is obvious that many other types of mountings, such, for example, as a dovetail-type, would be entirely satisfactory. While in the conventional types of blade mountings mentioned, the blade bases are in abutting contact generally, in this invention, the adjacent bases are separated by a kerf-like space which is defined by adjacent base walls. This kerf-like space extends at a right angle to the plane of rotor 11 although some variation is contemplated.

The bucket 12 is mounted on the disk 11 by means of its mounting base 13 which fits the disk mounting 14. After each bucket 12 is applied tangentially to the wheel 11, a single discrete wafer or spacer 15, as best shown in Fig. 6, is inserted so that the wafer or spacer 15 fits between the mounting bases 13 and adjacent walls 8 and 9 of adjoining buckets. The assembly of the wafers or spacers 15 between the buckets as the wheel is assembled still allows the wheel to be assembled solidly but the wafers which are of resilient character and may be composed of a material, such as metal, plastic or temperature-resistant rubber, allow motion of the bucket when it tends to vibrate, thus adding to damping of the bucket. The wafer 15 preferably takes the shape of the mountings of the buckets between which it is inserted. This enables both surfaces of the wafer to be in abutting contact with their respective mounting across the entire surface thereof. However, the wafer may take a form wherein its surface area is less than the surface area of the adjoining mountings.

The choice of material for the wafers or spacers 15 will depend on its ability to withstand turbine temperature and gases. Motion created by the vibration of the buckets 12 will cause the material of the wafers 15 to be alternately stressed. The material of which the wafers are made will dissipate vibratory energy through material damping. Additional damping will result from the relative rubbing of the wafers 15 and bucket mounting bases 13. A resilient wafer is preferably used which will provide both material damping and rubbing friction damping. A soft rubber wafer could be employed to provide only material damping if desired since the wafer material would deform to such an extent that no rubbing friction would occur. If a maximum of rubbing friction is desired, a thin resilient wafer of hard steel having a thin plating of a solid lubricant on both surfaces would be used.

In operation, when the blades or buckets, such as that illustrated, are subjected to a vibrational stress, the buckets are bent alternately in the direction or rotation and in the reverse direction thereof. This motion will occur due either to looseness of the fit of the bucket mounting on the disk mounting or to the elastic deformation of the bucket material. When the buckets are bent in accordance with this fundamental mode, the spacers or wafers are stressed in opposite directions. Accordingly, the material of which the wafer is made will dissipate vibratory energy through material damping. The alternate rubbing of the wafers and the adjoining bucket mountings sets up frictional forces along those surfaces defined by the mountings. These frictional forces tend to damp the vibration of the buckets thereby limiting the amplitude thereof.

Fig. 2 is a modification of a turbine bucket assembly used to provide damping of the turbine bucket vibration comprising resilient spacers or wafers, preferably having a surface contact area identical with the surface contact area of the adjoining bucket mountings, provided between the dovetail mountings of adjoining buckets mounted on a wheel. The general construction and the operation of the preferred embodiment of Fig. 1 and the modification of Fig. 2 are similar with the exception of the configuration of the resilient spacers and adjoining bucket mountings.

As in Fig. 1, a turbine bucket assembly is indicated generally at 20, comprising a rotor or turbine disk 21 having a plurality of buckets or blades such as 22 mounted in uniform spacing around the periphery thereof. The buckets 22 may be mounted tangentially on the disk 21 by means of a blade dovetail 23. The bucket 22 is mounted on the disk 21 tangentially by means of its dovetail mounting 23 which fits the disk dovetail 24. After each bucket 12 is applied to the wheel 21, a resilient wafer or spacer 25, as best shown in Fig. 7, is inserted so that the wafer or spacer 25 fits between the mountings 23 of adjoining buckets 22. The assembly of the wafers or spacers 25 between the buckets 22 as the wheel 21 is assembled still allows the wheel to be assembled solidly. The resilient character of the wafers allows motion of the bucket when it tends to vibrate, thus increasing damping of the buckets. The wafers 25 preferably take the shape of the mountings of the buckets between which they are inserted. The dovetail margins of the wafers tend to retain the wafers in position during operation of the wheel 21. The wafers 25 may take a form wherein their surface areas are less than the surface areas of the adjoining mountings 23.

The operation of the rotor and bucket assembly disclosed in Fig. 2 is identical with the operation of the rotor and bucket assembly as fully disclosed above in reference to Fig. 1. Accordingly, the detailed description is not repeated for Fig. 2.

Fig. 3 is a further modified turbine bucket assembly used to provide damping of the turbine bucket vibration comprising resilient spacers or wafers, preferably having side surface areas identical with the surface contact area of the adjoining bucket mountings, provided between the outside-hook dovetail mountings of adjoining buckets mounted on a rotor. The general construction and the operation of the preferred embodiment of Fig. 1 and the modification of Fig. 3 are similar with the exception of the configuration of the resilient wafers or spacers and adjoining bucket mountings.

As in Fig. 1, a turbine bucket assembly is indicated generally at 30, comprising a rotor or turbine disk 31 having a plurality of buckets or blades such as 32 mounted in uniform spacing around the periphery thereof. The buckets 32 may be mounted tangentially on the disk 31 by means of a blade dovetail 33 having a fit with a disk dovetail 34. The bucket 32 is applied to disk 31 tangentially by means of its dovetail mounting 33 which fits the disk dovetail 34. After each bucket 32 is applied to the wheel 31, a resilient spacer or wafer 35, as best shown in Fig. 8, is inserted so that the wafer or spacer 35 fits between the mountings 33 of adjoining buckets 32. The assembly of the wafers or spacers 35 between the buckets 32 as the wheel 31 is assembled still allows the wheel to be assembled solidly. The wafers 35 preferably take the dovetail shape of the mountings of the buckets between which they are inserted. The dovetail margins of the wafers tend to retain the wafers in position during operation of the rotor 31. The wafers 35 may take a form wherein their side surface areas are less than the surface areas of the adjoining mountings 33.

The operation of the rotor and bucket assembly disclosed in Fig. 3 is identical with the operation of the rotor and bucket assembly as fully disclosed above in reference to Fig. 1. Accordingly, the detailed description is not repeated for Fig. 3.

Fig. 4 is a further modification of a turbine bucket assembly used to provide damping of the turbine bucket vibration comprising resilient spacers or wafers, preferably having a surface contact area identical with the surface area of the adjoining bucket mountings, provided between the mountings of adjoining buckets mounted tangentially on a rotor. The construction and the operation of the preferred embodiment of Fig. 1 and the modification of Fig. 4 are similar with the exception of lip or flange extending from the rear of the bucket platform for purposes to be hereinafter described.

Fig. 4 is an additional modification of a turbine bucket assembly wherein a tangential bucket mounting such as used in steam turbine construction and described above in relation to Fig. 1 is employed. Since the modified structure of Fig. 4 is described hereinbelow in reference to the structure shown in Fig. 1, similar parts will bear similar numerals.

As in Fig. 1, a turbine bucket assembly is indicated generally at 10, comprising a rotor or turbine disk 11 having a plurality of buckets or blades 12 mounted in uniform spacing around the periphery thereof. Each of the blades 12 is shown as tangentially mounted on the disk 11 by means of a conventional mounting 13 having a fit with a disk mounting 14. While a conventional type of mounting is illustrated, it is obvious that many other types of tangential mountings, such for example, as a dovetail type, would be entirely satisfactory.

The bucket 12 is tangentially applied to the disk 11 by means of its mounting 13 which fits the disk mounting 14. Each bucket 12 is provided with a lip or flange 16 extending from the rear of the bucket platform to form an upper closure for retaining a resilient wafer or spacer 17 between adjoining bucket mountings 13. The lip 16 preferably extends along the entire width of the bucket platform. After each bucket 12 is applied tangentially to the wheel 11, a resilient wafer or spacer 17 is inserted so that the wafer or spacer 17 fits between the mountings 13 of adjoining buckets. The lip or flange 16 will form an outer closure for the wafer 17 thereby retaining it in position between adjoining mountings 13 when the wheel 11 is in operation. The assembly of the wafers or spacers 17 between the buckets as the wheel is assembled still allows the wheel to be solidly assembled. A slight clearance 64 is provided between the free edge of the lip 16 and the front of the adjoining bucket platform.

The operation of the rotor and bucket assembly disclosed in Fig. 4 is identical with the operation of the rotor and bucket as fully disclosed above in reference to Fig. 1. Accordingly, the detailed description is not repeated for Fig. 4.

Fig. 9 is a further modification of a turbine bucket assembly, which can be used in gas turbine construction or particularly where the turbine buckets are axially applied to the wheel or rotor. Axially mounting buckets upon a turbine rotor is a well known practice. In this instance the dovetail mounting, for example, in Fig. 9 is formed in a direction generally transversely to the plane of the turbine rotor and thereafter each bucket with its corresponding dovetail is merely inserted axially or into the plane of the rotor for affixation. The operation of the preferred embodiment of Fig. 1 and the modification of Fig. 9 are similar.

As in Fig. 1, a turbine bucket assembly is indicated generally at 40, comprising a rotor or turbine disk 41 having a plurality of buckets or blades such as 42 mounted in uniform spacing around the periphery thereof. The buckets 42 may be mounted axially on the disk 41 by means of a blade dovetail 43 having a fit with a disk dovetail 44. The bucket 42 is applied axially to the disk 41 by means of its dovetail mounting 44. The mounting 43 is extended radially outwardly beyond the rim of the rotor 41 in distinction to the conventionally mounted dovetail-type bucket. Each bucket 42 is provided with a lip or flange 45 extending from the rear of the bucket platform to form an upper closure for retaining a resilient wafer or spacer 46 between adjoining bucket mountings 43. The lip 45 preferably extends along the entire width of the bucket platform as illustrated in Fig. 10. After each bucket 42 is applied axially to the wheel 41, a resilient wafer or spacer 46 is inserted so the wafer or spacer 46 fits between the radially extended surfaces of the mountings 43 of adjoining buckets. The lip or flange 45 will form an outer closure for the wafer 46 thereby retaining it in position between adjoining mountings 43 when the wheel 41 is in operation. The assembly of the wafers or spacers 46 between the buckets as the wheel is assembled still allows the wheel to be solidly assembled. A slight clearance 64 is provided between the free edge of the lip 45 and the front of the adjoining bucket platform.

The operation of the rotor and bucket assembly disclosed in Fig. 9 is identical with the operation of the rotor and bucket assembly as fully disclosed above in reference to Fig. 1. Accordingly, the detailed description is not repeated for Fig. 9.

Fig. 11 discloses a further modification of a turbine bucket assembly which can be used in steam turbine construction or particularly where the turbine buckets are tangentially applied to the wheel or rotor. The operation of the preferred embodiment of Fig. 1 and the modification of Fig. 11 are similar.

As in Fig. 3, a turbine bucket assembly is indicated generally at 30, comprising a rotor or turbine disk 31 having a plurality of buckets or blades such as 32 mounted in uniform spacing around the periphery thereof. The buckets 32 may be mounted tangentially on the disk 31 by means of a blade dovetail 33, Fig. 12, having a fit with a disk dovetail 34. The bucket 32 is applied tangentially to the disk 31 by means of its dovetail mounting 33. The front surface 47 of the mounting 33 is preferably provided with a pair of spaced holes 36 located near the bucket platform. A similar pair of spaced holes 37 are provided on rear surface of the mounting 33 in axial alignment with the holes 36. A pair of pins 38 are adapted to fit into the holes 36 and 37 on adjoining bucket mountings. After each bucket 32 is applied tangentially to the wheel 31, a resilient spacer or wafer 35 is next applied. The wafer 35 is provided with a pair of spaced holes 39 in alignment with the holes 36 and 37. Pins 38 are inserted through the holes 39 of the wafer 35 into the holes 36 of the mounting 33. An adjoining bucket 32 is then applied tangentially to the wheel 31. The pins 38 will thereby be inserted into the holes 37 of the mounting. The pins 38 will retain the wafers 35 in position between adjoining mountings 33 when the wheel 31 is in operation. The assembly of the wafers or spacers 35 between the buckets as the wheel is assembled still allows the wheel to be solidly assembled.

The operation of the rotor and bucket assembly disclosed in Fig. 11 is identical with the operation of the rotor and bucket assembly as fully disclosed above in reference to Fig. 1. Accordingly, the detailed description is not repeated for Fig. 11.

Fig. 13 discloses a further modified turbine bucket assembly which can be used in gas turbine construction or particularly where the turbine buckets are radially applied to the wheel or rotor. The operation of the preferred embodiment of Fig. 1 and the modification of Fig. 13 are similar.

As in Fig. 1, a turbine bucket assembly is indicated generally at 50, comprising a rotor or turbine disk 51 having a plurality of buckets or blades 52 mounted in uniform spacing around the periphery thereof. The buckets 52 may be mounted axially on the disk 51 by means of a blade dovetail 53 having a fit with a disk dovetail 54. The buckets 52 are applied axially to the disk 51 by means of their dovetail mountings 54. A portion of each of the mountings 53 extend radially outwardly from the rim of the wheel 51. The front surface of the mounting 53 is preferably provided with a pair of spaced holes 55 located near the bucket platform. A similar pair of holes 56 are spaced from the holes 55 and located near the rim of the wheel 51. A pair of spaced holes 57 are provided on the rear surface of the mounting 53 in axial alignment with the holes 55. A pair of holes 58 are spaced from the holes 57 near the rim of the wheel 51 and in axial alignment with the holes 56. A pair of pins 59 are adapted to fit into the holes 55 and 57. A second pair of pins 60 are adapted to fit into the holes 56 and 58. A resilient wafer 61 is provided with two pairs of spaced holes 62 and 63 in alignment with the holes 55 and 57, and the holes 56 and 58. The pair of pins 59 are inserted through the pair of holes 62 in the wafer 61 into the pair of holes 55. The second pair of pins 60 are inserted through the holes 63 in the wafer 61 into the pair of holes 56. An adjoining bucket is then applied to the pins extending from the mounting of the first assembled bucket. The pins 59 fit into the holes 57 on the rear of the bucket mounting. The pins 60 fit into holes 58. After the buckets 52 have been assembled, they are mounted on the wheel 51 by means of their dovetail mounting 53 which fit into the disk dovetails 54. The pins 59 and 60 will retain the wafers 61 in position between adjoining mountings 53 when the wheel 51 is in operation. The assembly of the wafers 61 between the buckets 52 before the buckets are mounted on the wheel 51 allows the wheel to be solidly assembled.

The operation of the rotor and bucket assembly disclosed in Fig. 13 is identical with the operation of the rotor and bucket assembly as fully disclosed above in reference to Fig. 1. Accordingly, the detailed description is not repeated for Fig. 11.

As will be apparent to those skilled in the art, the objects of our invention are attained by the use of resilient wafers or spacers inserted between adjoining turbine bucket mountings thereby increasing the damping of the buckets.

While other modifications of this invention and variations of apparatus which may be employed within the scope of the invention have not been described, the invention is intended to include all such as may be embraced within the following claims.

What we claim as new and desire to secure by Letters Patent of the United States is:

1. In a fluid machine, a rotor having a plurality of buckets mounted circumferentially thereon, a base on one end of each of said buckets mounting said buckets on said rotor, the adjacent walls of adjacent bases being of planar form and defining a kerf space between said bases, a thin discrete resilient wafer having substantially parallel and planar surfaces positioned in each of said kerf spaces, the said planar surfaces of said wafers being in abutting contact with the said adjacent base walls of said adjacent bases, and a lubricant between the said wafer and said adjacent base walls, the fit of the said wafer between said adjacent base walls being such to permit relative motion therebetween for rubbing friction vibration damping in addition to material vibration damping of the wafer, and retaining means retaining said wafer in position.

2. A turbine bucket assembly comprising a rotor, a plurality of buckets mounted circumferentially on said rotor, a base on each of said buckets mounting said buckets on said rotor, adjacent bases of adjacent buckets having adjacent walls of planar form defining therebetween a radial kerf space perpendicular to the plane of said rotor, a thin single discrete resilient wafer having parallel side walls of planar form filling said kerf space with the said side walls thereof parallel to and engaging the said adjacent walls of said adjacent bases, said wafer absorbing vibrations by material damping, and a lubricant coating on said wafer between the said wafer and the said adjacent base walls to permit relative motion therebetween for vibration damping by rubbing friction, and retaining means retaining said wafers in position.

References Cited in the file of this patent

UNITED STATES PATENTS

| | | |
|---|---|---|
| 1,008,758 | Warren | Nov. 14, 1911 |
| 1,062,737 | Richter | May 27, 1913 |
| 1,178,452 | London | Apr. 4, 1916 |
| 1,891,948 | Rice | Dec. 27, 1932 |
| 2,310,412 | Flanders | Feb. 9, 1943 |
| 2,405,283 | Birmann | Aug. 6, 1946 |
| 2,636,399 | O'Connor | Apr. 28, 1953 |
| 2,642,263 | Thorp | June 16, 1953 |
| 2,664,240 | Gorton | Dec. 29, 1953 |
| 2,669,383 | Purvis | Feb. 16, 1954 |
| 2,722,849 | O'Connor | Nov. 8, 1955 |

FOREIGN PATENTS

| | | |
|---|---|---|
| 124,821 | Switzerland | Mar. 1, 1928 |
| 502,615 | Belgium | May 15, 1951 |
| 554,119 | Germany | July 13, 1932 |
| 652,099 | Great Britain | Apr. 18, 1951 |
| 670,665 | Great Britain | Apr. 23, 1952 |
| 671,960 | Great Britain | May 14, 1952 |